United States Patent
Ali

(10) Patent No.: US 8,862,290 B1
(45) Date of Patent: Oct. 14, 2014

(54) FLIGHT SYSTEM FOR AN AIRCRAFT HAVING AN AUTOLAND SYSTEM

(71) Applicant: GE Aviation Systems LLC, Grand Rapids, MI (US)

(72) Inventor: Sherif Fouad Ali, Safety Harbor, FL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/865,349

(22) Filed: Apr. 18, 2013

(51) Int. Cl.
*G06F 19/00* (2011.01)
*G06F 11/00* (2006.01)
*G06F 9/46* (2006.01)
*G08G 5/02* (2006.01)

(52) U.S. Cl.
CPC .................................. *G08G 5/02* (2013.01)
USPC ................. 701/16; 714/10; 714/11; 718/104

(58) Field of Classification Search
USPC ............ 701/16, 11, 416; 714/10, 11; 718/104
See application file for complete search history.

(56) References Cited

U.S. PATENT DOCUMENTS

| | | | | |
|---|---|---|---|---|
| 5,313,625 A * | 5/1994 | Hess et al. | | 714/10 |
| 5,714,948 A * | 2/1998 | Farmakis et al. | | 340/961 |
| 6,163,480 A * | 12/2000 | Hess et al. | | 365/185.08 |
| 6,813,527 B2 * | 11/2004 | Hess | | 700/82 |
| 6,845,304 B1 * | 1/2005 | Young | | 701/16 |
| 7,877,627 B1 * | 1/2011 | Freydel | | 714/11 |
| 8,027,756 B2 * | 9/2011 | Davis et al. | | 701/8 |
| 8,195,347 B2 * | 6/2012 | Boorman | | 701/16 |
| 8,423,207 B2 * | 4/2013 | Davis et al. | | 701/8 |
| 2010/0305786 A1 * | 12/2010 | Boorman | | 701/16 |
| 2011/0022250 A1 * | 1/2011 | Hamburg | | 701/11 |
| 2013/0079958 A1 * | 3/2013 | Neri et al. | | 701/16 |
| 2013/0205301 A1 * | 8/2013 | Easwaran et al. | | 718/104 |
| 2014/0019038 A1 * | 1/2014 | Shehi et al. | | 701/416 |

* cited by examiner

*Primary Examiner* — Thomas G Black
*Assistant Examiner* — Tyler Paige
(74) *Attorney, Agent, or Firm* — McGarry Bair PC

(57) ABSTRACT

A method and system for operating an aircraft having an autoflight system comprising flight guidance functionality and autoland functionality providing input to a flight control system such that both the autoflight and autoland functionality and their corresponding systems are operated at a Design Assurance Level A.

16 Claims, 1 Drawing Sheet

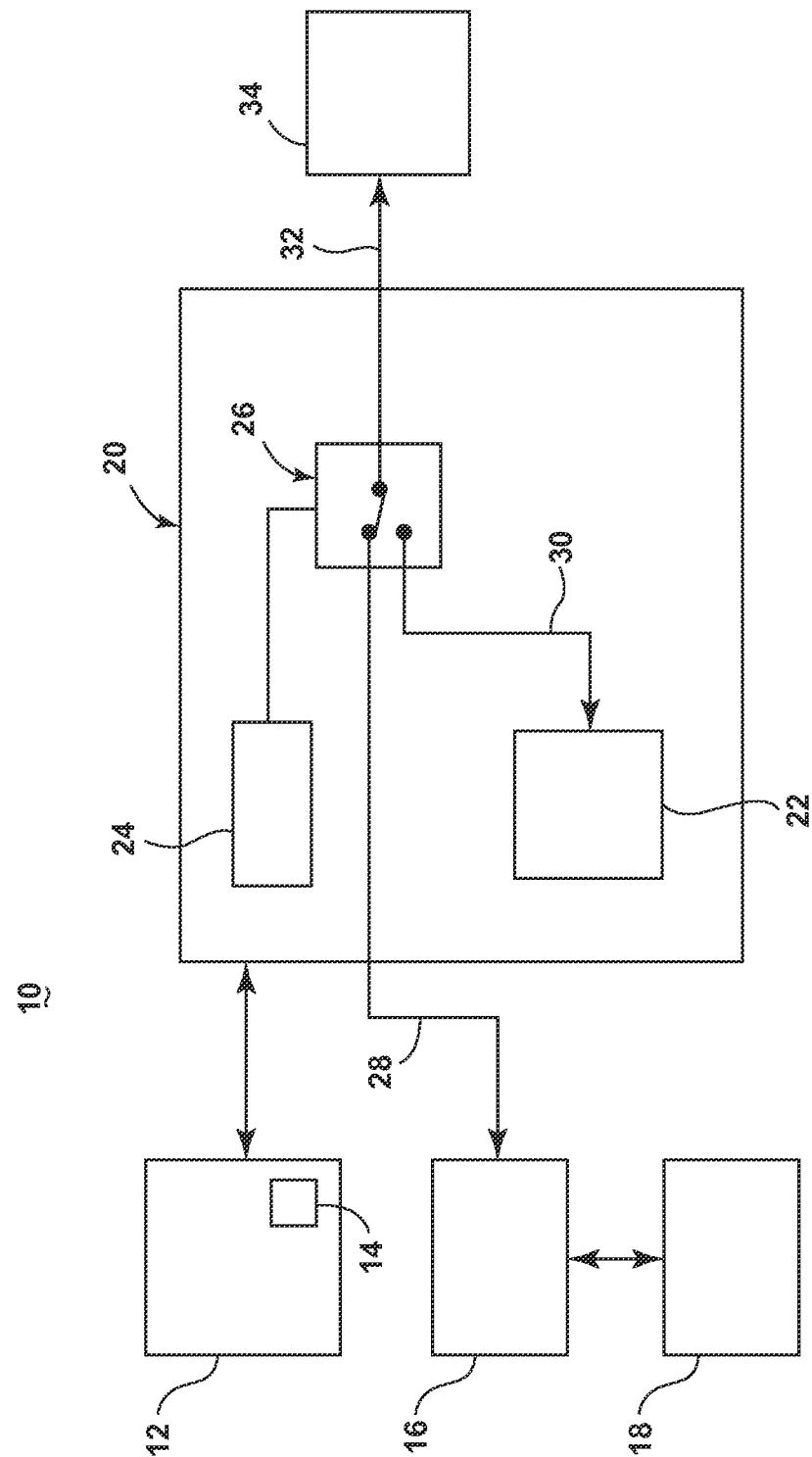

FLIGHT SYSTEM FOR AN AIRCRAFT HAVING AN AUTOLAND SYSTEM

BACKGROUND OF THE INVENTION

In aviation, the autoland system fully automates the landing phase of an aircraft's flight, with the human crew supervising the process. Responding to external stimuli, the autoland system is primarily engaged in conditions of poor visibility and calm or steady winds.

A typical autoland system consists of an instrument landing system (ILS) radio, having an integrated glideslope receiver, localizer receiver, and perhaps GPS receiver as well, to receive the localizer and glideslope signals. The output of this radio will be a "deviation" from center which is provided to the flight control computer to direct the flight control system and aircraft control surfaces to maintain the aircraft centered on the localizer and glideslope. The flight control system will additionally control throttles to maintain the appropriate approach speed. After aircraft wheels-down, the autoland system may also include automatic braking to a full stop, in conjunction with the autobrake system, and sometimes auto deployment of spoilers and thrust reversers.

Auto-landing the aircraft is governed by stringent regulations to insure that the aircraft will land safely at the designated area on the runway (landing box) with a very high probability. Demonstrating compliance with those regulations is a very expensive process that includes simulations, flight testing, statistics, and analysis. Because the failure to perform the landing safely can cause catastrophic results, the associated systems have to go through the most rigorous Design Assurance Level (DAL), DAL A.

BRIEF DESCRIPTION OF THE INVENTION

In one aspect, a method of operating an aircraft having an autoflight system comprising flight guidance functionality and autoland functionality providing input to a flight control system, the method includes flying the aircraft by providing input to the flight control system from a design assurance level (DAL) B or lower flight guidance program, and in response to a request for autoland functionality, switching from the flight guidance program to a DAL A autoland program for providing input to the flight control system. The DAL A program resides in the memory of a computer in the aircraft in a software partition separate from the flight guidance program.

In another aspect, a flight system for an aircraft having multiple control surfaces for controlling the flight of the aircraft, the flight system includes a flight control system receiving flight control inputs and controlling the operation of the control surfaces according to the flight control inputs and an avionics system. The avionics system further includes at least one computer, with a corresponding memory, a flight guidance program, having a design assurance level (DAL) of B or lower, stored in the memory and providing control inputs for the flight control system to control the flying of the aircraft, an autoland program, having a DAL A, stored in the memory as a separate software partition from the flight guidance program and providing control inputs for the flight control system to control the automatic landing of the aircraft, and a switching program residing in the memory to control which of the flight guidance program and the autoland program provide the control inputs to the flight control system. When the autoland program is selected by the switching program, the autoland program assumes control of the flight control system from the flight guidance program.

BRIEF DESCRIPTION OF THE DRAWINGS

In the drawings:

FIG. 1 is a schematic view of the autoflight system in accordance with one embodiment of the invention.

DESCRIPTION OF EMBODIMENTS OF THE INVENTION

While embodiments of the invention may be implemented in any aircraft environment using an autoland system, it is currently contemplated to be implemented in a software partition of an aircraft, where the autoland system is to be certified to a high level of design assurance level (DAL), such as in commercial aircraft. Thus, a brief summary of the contemplated system environment should aid in a more complete understanding.

Modern aircraft contain avionics systems to perform individual or system functions for the aircraft. Examples of these electronic systems include communications, navigation, the display and management of multiple systems, collision-avoidance, weather radar, and even health and usage monitoring systems.

One specific avionics system is the flight control system (FCS), a system of flight control surfaces, cockpit controls, engine controls, and the necessary operating mechanisms to control an aircraft's direction in flight. This system allows for control of roll, pitch, yaw, and airspeed, by a pilot or another avionics system, by actuating the control surfaces of the aircraft or thrust generation of the engine. The flight control system may make the necessary linkages from the cockpit to the surfaces and engine by mechanical, hydro-mechanical, or by electronic transmission signals and control computers in a "fly-by-wire" system, which is of particular interest in the current embodiment. In a fly-by-wire system, a primary flight control computer governs the flight control surfaces based on pilot or flight system input.

One such interface for displaying various avionics systems, including the flight control system, is the primary flight display (PFD) located in the cockpit. Like many displays, PFDs are built around an LCD or CRT display device. Additionally, the PFD uses other avionics systems to make altitude, airspeed, vertical speed, and other measurements precisely using air pressure and barometric readings. An air data computer analyzes the information and displays it to the pilot in a readable format.

Another avionics system is the flight management system (FMS). The FMS includes the flight planning, generation of flight path, speed profiles tied to waypoints, and other flight planning aspects. However, the FMS does not include the systems necessary for execution of flight path or speed commands. The primary execution of flight path or speed commands are performed by the manual control of a pilot, or alternatively, by interfacing with yet another avionics system, a flight guidance system (FGS).

The FGS is primarily intended to assist the flightcrew in the basic control and tactical guidance of the airplane. The system may also provide workload relief to the pilots and provide a means to fly a flight path more accurately to support specific operational requirements, such as reduced vertical separation minimum (RVSM) or required navigation performance (RNP). When the FGS is engaged, the FMS provides guidance commands for the purpose of automatic navigation and speed control. In some embodiments, the FGS may include the components of an autoflight system.

An autoflight, or autopilot system, is used to guide a vehicle without assistance from a pilot. The autopilot system receives inputs from on-board radio navigation systems and other instruments to permit the aircraft to fly, for instance, straight and level on a compass course without a pilot's attention. Modern autopilot systems use computer software to control the aircraft. The software reads the aircraft's current position, and then instructs the Flight Control System to guide the aircraft. Autopilot systems in modern complex aircraft generally divide a flight into takeoff, ascent, cruise (level flight), descent, approach, and landing phases.

A subdivision of an autopilot system, a controlled landing on a runway, is known as an autoland. The autoland system fully automates the landing phase of an aircraft's flight, with the human crew supervising the process. Responding to external stimuli, the autoland system is primarily engaged in conditions of poor visibility and calm or steady winds.

A typical autoland system consists of an instrument landing system (ILS) radio, having an integrated glideslope receiver, localizer receiver, and perhaps GPS receiver as well, to receive the localizer and glideslope signals. The output of this radio will be a "deviation" from center which is provided to the flight control computer to control the aircraft control surfaces to maintain the aircraft centered on the localizer and glideslope, as well as control throttles to maintain the appropriate approach speed. After aircraft wheels-down, the autoland system may also include automatic braking to a full stop, in conjunction with the autobrake system, and sometimes auto deployment of spoilers and thrust reversers.

Since many modern avionics systems, including autoflight and autoland, are based primarily in software, special software certification requirements are required. The safety of software used in airborne avionics systems is guided by the Federal Aviation Administration's (FAA) application of the document DO-178B, Software Considerations in Airborne Systems and Equipment Certification. This document is used for guidance to determine if given software will perform reliably in an airborne environment. The software level, also known as the design assurance level (DAL), is determined from the safety assessment process and hazard analysis by examining the effects of a failure condition in the particular system. The failure conditions are categorized by their effects on the aircraft, crew, and passengers, in descending order from A to E. In the following discussion, DAL A compliance will be referred to as "higher than" or "above" DAL B, C, D, and E compliance, while DAL B or DAL C compliance will be referred to as "under" or "below" DAL A compliance. Table 1 demonstrates DAL level, failure conditions, and failure effect on the aircraft.

TABLE 1

| DAL Level and Failure Effects | | |
|---|---|---|
| DAL Level | Failure condition | Failure Effect on Aircraft |
| A | Catastrophic | Failure may cause a crash. Error or loss of critical function required to safely fly and land aircraft. |
| B | Hazardous | Failure has a large negative impact on safety or performance, or reduces the ability of the crew to operate the aircraft due to physical distress or a higher workload, or causes serious or fatal injuries among the passengers. (Safety-significant) |
| C | Major | Failure is significant, but has a lesser impact than a Hazardous failure (for example, leads to passenger discomfort rather than injuries) or significantly |

TABLE 1-continued

| DAL Level and Failure Effects | | |
|---|---|---|
| DAL Level | Failure condition | Failure Effect on Aircraft |
| D | Minor | increases crew workload (safety related) Failure is noticeable, but has a lesser impact than a Major failure (for example, causing passenger inconvenience or a routine flight plan change) |
| E | No Effect | Failure has no impact on safety, aircraft operation, or crew workload. |

DO-178B alone is not intended to guarantee software safety aspects. Safety attributes in the design and as implemented as functionality must receive additional mandatory system safety tasks to drive and show objective evidence of meeting explicit safety requirements. These software safety tasks and artifacts are integral supporting parts of the process for hazard severity and DAL determination to be documented in system safety assessments (SSA). The certification authorities require and DO-178B specifies the correct DAL be established using these comprehensive analyses methods to establish the DAL level A-E. It is the software safety analyses that drive the system safety assessments that determine the DAL that drives the appropriate level of rigor in DO-178B. Furthermore, interactions between avionics systems of varying DAL levels must incorporate data and calculation integrity protections to ensure certified operational effectiveness. Therefore, DO-178B central theme is design assurance and verification after the prerequisite safety requirements have been established.

The various DAL compliant software programs reside in at least one computer system, each having one or more corresponding memory devices for program storage. Multiple DAL compliant software programs, of different DAL level compliance, may reside in a single memory device, multiple memory devices across multiple computers, or under separate software partitions in one or more memory devices such that the integrity of the higher level DAL compliant software is not contaminated by the lower level DAL software. In this sense, software portioning occurs when a single hardware module or computer system is divided into multiple logical units, with each unit capable of completing the given tasks for an avionics system simultaneously, and without detriment to any other partitioned avionics system. Each software partition is independently DAL certified.

Demonstrating compliance with those regulations is an expensive process that includes simulations, flight testing, statistics, and analysis. In many instances, the costs of developing a DAL A compliant system versus a DAL B or C compliant system is dramatically more expensive and resource intensive. For example, the cost of developing a DAL A compliant flight guidance system is estimated as threefold more expensive than a DAL B or C compliant flight guidance system. Thus, the development costs of DO-178B compliant software increases with a higher DAL levels. Because the failure to perform the landing safely can cause a catastrophic results, the associated systems have to go through the most stringent compliance level, DAL A.

As illustrated in FIG. 1, an autoflight system 10 comprises a primary flight display (PFD) 12, having a flight mode annunciation system 14, a flight guidance system (FGS) 16, and a flight management system (FMS) 18. Each of the PFD 12, FGS 16 and FMS 18 are represented as software components, even though each may have a physical component. An exemplary physical component for the software components may be a special purpose computing device, such as a GE B787 Common Core System. The flight mode annunciation system 14 is used for indication or annunciation of particular operations to the pilot. The PFD 12 may incorporate additional indicators, such as lights or display components which indicate particular operations or functionalities to the pilot. For example, the PFD 12 may have at least one such LED that illuminates when the autoland functionality is selected, has been selected, or is engaged. Additional methods of indication for autoland and other systems operations are envisioned.

The PFD 12 interfaces with the FGS 16 in such a way to enable two-way communication between the PFD 12 and the FGS 16. Similarly, the FGS 16 interfaces with the FMS 18 in such a way to enable two-way communication between the FGS 16 and the FMS 18. In the current embodiment, the PFD 12 is a DAL A compliant, while both the FGS 16 and the FMS 18 are below DAL A compliant. For example, the FGS 16 may be DAL B compliant, while the FMS 18 may be DAL C compliant.

The autoflight system 10 further comprises an autoland system 20 having autoland controller 22, sensing components such as monitors 24, and a switch 26. The autoland controller 22 further includes the necessary components and programs to operate the autoland guidance of an aircraft landing. The monitors 24 are configured to poll aircraft sensors or systems in order to sense a predefined trigger event. In the event that a trigger event is sensed, the monitors 24 may actuate the switch 26. The switch 26 may be a device that physically couples and decouples an electrical connection, or it may be an electronic switch which allows a specific signal through the device.

The autoland system 20 further comprises a two-way pass-through coupling 28 that couples the FGS 16 to the switch 26, a two-way autoland coupling 30 that couples the autoland controller 22 to the switch 26, and an autoland system output 32 at the output of the switch 26. The autoland system 20 is configured in such a way that when the autoland functionality is disabled, or enabled but not yet operational, the switch 26 is in a first position, allowing the FGS 16 to be connected through the pass-through coupling 28 of the autoland system 20 and switch 26 to the autoland system output 32. In this way, the autoland system 20 permits two-way data communications from the FGS 16 to the autoland system output 32 without any further processing.

The autoland system 20 is further configured in such a way that when the autoland functionality is enabled and operational, the switch 26 is in a second position, allowing the autoland controller 22 to be connected through the autoland coupling 30 and the switch 26 to the autoland system output 32. In this way, the autoland system 20 permits two-way data communications from the autoland controller 22 to the autoland system output 32 and ceases data communications from the FGS 16 to the autoland system output 32. In this configuration, the autoland system 20 additionally permits two-way communication between the PFD 12 and the autoland controller 22.

The autoflight system 10 yet further comprises a flight control system (FCS) 34 coupled to the autoland system output 32 for two-way data communication with either the FGS 16 or autoland controller 22.

During operation of the aircraft, the flying is performed by the autoflight system 10 having a DAL B or lower level FGS 16. During this time, the autoland functionality is disabled and thus, the switch 26 is in the first position. Consequently, the FGS 16 controls the FCS 34 using the pass-through coupling 28 of the autoland system 20. In this mode, there are no indicators showing activation of the autoland system 20 on the PFD 12. Additionally, the flight mode annunciation system 14 is either not making announcements, or not making announcements about autoland functions.

A pilot then requests autoland functionality through the PFD 12, a DAL A compliant environment, or another interface, such as a button. The PFD 12 bi-directionally communicates with the monitors 24 and autoland controller 22 of the autoland system 20, a DAL A compliant environment, in preparation for the autoland system 20 assuming control of the FCS 34. Additionally, the PFD 12 bi-directionally communicates with the FGS 16, while retaining the DAL A level integrity of the PFD 12, such that the PFD 12 will check the aircraft operating conditions and decide if the autoland system 20 is capable of performing an autoland. In this sense, the autoland functionality is enabled, but not yet operational.

If the outcome of that condition check is yes, the FGS 16 modifies the guidance to begin an approach vector and speed for landing. During this time, the FGS 16 is still in control of the FCS 34. In this mode, there are may be indicators showing the autoland system 20 is enabled, but not that the autoland system is controlling the aircraft, on the PFD 12. Additionally, the flight mode annunciation system 14 may be making announcements of the same indications.

Next, the monitors 24 begin measuring for the trigger conditions to switch control of the FCS 34 to the autoland controller 22. Once the trigger conditions are measured by the monitors 24, such as the aircraft passing below a prescribed altitude, the monitors 24 direct the switch 26 to the second position, ceasing control of the FCS 34 by the FGS 16 and enabling control of the FCS 34 by the autoland controller 22. During this period, there are no avionics systems below DAL A compliance which are in communication with the autoland system 20. In this mode, an indicator may be present on the PFD 12, indicating autoland functionality is enabled, operational, and controlling the aircraft. Additionally, the flight mode annunciation system 14 may be making announcements of the same indications. The DAL A compliant autoland system 20 directs the FCS 34 until the plane makes a safe landing.

It is additionally known that during autoland functionality, even though the FGS 16 may not be directing the FCS 34, the FGS 16 is still operational, such that, should a pilot abort the autoland functionality, or should autoland system 20 become incapable of continuing the autoland functionality, the switch 26 may alternate back to the first position, and the FGS 16 will again assume control of the FCS 34.

Many other possible embodiments and configurations in addition to that shown in the above FIGURE are contemplated by the present disclosure. For example, a configuration is envisioned wherein the switch 26 only disables data communication in the direction from the FGS 16 to the autoland system output 32 while in the second position. In this configuration, data communication would still be permitted in the direction of the FCS 34 to the FGS 16 while the autoland system 20 was engaged. Another example is considered wherein the autoland controller 22 is always in bi-directional data communications with the PFD 12, as opposed to only when the switch 26 is in the second position. Another embodiment may include a PFD 12 which is DAL B or C compliant, in which any data communication between the PFD 12 and autoland system 20 will be unidirectional from the autoland system 20 to the PFD 12, or the PFD 12 will no longer be in communication with the autoland system 20 while the autoland functionality is operational, in order to maintain DAL A data and software integrity. Yet another example contemplated by the present disclosure includes hardware partitions, such as separate physical computer modules for one or more of the avionics systems, instead of the described software partitions.

The embodiments disclosed herein provide a flight system for an aircraft and method of operating such for providing autoland functionality in a DAL A compliant system. One advantage that may be realized in the above embodiments is that the above described embodiments enable DAL A certification of the autoland system software module, wherein the technical effect is that software module may be combined without additional DAL A certified software modules in a single hardware module, separated by software partitions. Thus, the number of individualized hardware modules may be reduced, resulting in lower weight and spatial requirements. Additionally, the autoland system may be DAL A certified without having to upgrade all the autoflight and flight management systems to the higher standard of DAL level A, while still providing the integrity of DAL A to the autoland system. Typically, upgrading the whole autoflight system or flight management systems would include validation of DAL A standards across all modes of operation, which there are many. Bringing all modes of operation to the DAL A standards would multiply the development costs.

Therefore, since fewer systems are availed to the more rigorous DAL A standards, the time and cost of certification and validation under the FAA and DO-178B is reduced. Thus the above embodiments have reduced time and cost requirements, and result in a competitive advantage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating an aircraft having an autoflight system comprising flight guidance functionality and autoland functionality providing input to a flight control system, the method comprising:
   flying the aircraft by providing input to the flight control system from a design assurance level (DAL) B or lower flight guidance program; and
   in response to a request for autoland functionality, switching from the flight guidance program to a DAL A autoland program for providing input to the flight control system;
   wherein the DAL A program resides in memory of a computer in the aircraft in a software partition separate from the flight guidance program and the switching ceases communication from the flight guidance program (DAL B) to the autoland program (DAL A) to provide data integrity.

2. The method of claim 1 further comprising providing an indication on a primary flight display in the aircraft of when the autoland functionality is providing input to the flight control system.

3. The method of claim 1 wherein the providing an indication comprises providing an indication of a selection of the autoland functionality.

4. The method of claim 1, further comprising permitting data communication from the flight control system to the flight guidance program while ceasing data communication from the flight guidance program to the flight control system.

5. The method of claim 4 further comprising permitting data communication from a primary flight display to the autoland program when the primary flight display is DAL A.

6. The method of claim 5 further comprising permitting bi-directional communication between the primary flight display and the autoland program.

7. The method of claim 1 further comprising permitting data communication from a primary flight display to the autoland program when the primary flight display is DAL A.

8. The method of claim 7 further comprising permitting bi-directional communication between the primary flight display and the autoland program.

9. A flight system for an aircraft having multiple control surfaces for controlling the flight of the aircraft, the flight system comprising:
   a flight control system receiving flight control inputs and controlling the operation of the control surfaces according to the flight control inputs;
   an avionics system comprising:
      at least one computer, with a corresponding memory;
      a flight guidance program, having a design assurance level (DAL) of B or lower, stored in the memory and providing control inputs for the flight control system to control the flying of the aircraft;
      an autoland program, having a DAL A, stored in the memory as a separate software partition from the flight guidance program and providing control inputs for the flight control system to control the automatic landing of the aircraft; and
      a switching program residing in the memory to control which of the flight guidance program (DAL B) and the autoland program (DAL A) provide the control inputs to the flight control system;
   wherein when the autoland program (DAL A) is selected by the switching program, the autoland program (DAL A) assumes control of the flight control system from the flight guidance program (DAL B) and the flight guidance program (DAL B) ceases communication with the autoland program (DAL A) to provide data integrity.

10. The flight system of claim 9 wherein the corresponding memory comprises multiple memory devices.

11. The flight system of claim 10 wherein the flight guidance program resides on one of the multiple memory devices and the autoland program resides on another one of the multiple memory devices.

12. The flight system of claim 9 wherein the at least one computer with a corresponding memory comprises multiple computers with corresponding memory.

13. The flight system of claim 12 wherein the flight guidance program resides on the corresponding memory of one of the multiple computers and the autoland program resides on corresponding memory of another one of the multiple computers.

14. The flight system of claim 9 further comprising a primary flight display (PFD), having a DAL A, in communication with the autoland program.

15. The flight system of claim 14 wherein the PFD is in bi-directional communication with the autoland program.

16. The flight system of claim 9 wherein the avionics system further comprises a plurality of non-DAL A systems, which are not in communication with the autoland program when the autoland program is selected by the switching program.

* * * * *